United States Patent [19]

Prince

[11] Patent Number: 4,735,277
[45] Date of Patent: Apr. 5, 1988

[54] MOTORCYCLE DRIVE WHEEL SUSPENSION SYSTEM

[76] Inventor: Curtis L. Prince, 1256 Riverbreeze Blvd., Ormond Beach, Fla. 32074

[21] Appl. No.: 70,095

[22] Filed: Jun. 15, 1987

Related U.S. Application Data

[63] Continuation of Ser. No. 708,809, Mar. 6, 1985, abandoned.

[51] Int. Cl.⁴ ............................................. B62K 25/04
[52] U.S. Cl. ................................. 180/227; 280/284
[58] Field of Search ................ 180/219, 227, 218; 280/283, 284, 285, 275, 281 R

[56] References Cited

U.S. PATENT DOCUMENTS

| | | | |
|---|---|---|---|
| 3,817,342 | 6/1974 | Hamilton | 180/227 |
| 4,114,918 | 9/1978 | Lutz | 180/227 |
| 4,408,674 | 10/1983 | Boyesen | 180/227 |
| 4,460,057 | 7/1984 | Kohyama | 180/219 |
| 4,463,824 | 8/1984 | Boyesen | 180/227 |
| 4,671,525 | 6/1987 | Ribi | 180/227 |

FOREIGN PATENT DOCUMENTS

| | | | |
|---|---|---|---|
| 2307695 | 11/1976 | France | 180/227 |
| 2547264 | 12/1984 | France | 180/227 |

*Primary Examiner*—John J. Love
*Assistant Examiner*—Everett G. Diederiks, Jr.

[57] ABSTRACT

A rear wheel suspension for a motorcycle wherein the rear wheel is mounted to the frame by a swing arm assembly including at least two swing arms. One of the swing arms being pivotally connected to the frame at one end and pivotally connected to the other arm at the other end. The other arm having the rear wheel rotatably mounted thereto. The arrangement permits freedom of movement in any direction of the rear wheel relative to the frame with the plane defined by the rotation of the wheel. A plurality of endless drive chains are used to link the engine's output to the rear wheel.

6 Claims, 8 Drawing Sheets

MOTORCYCLE DRIVE WHEEL SUSPENSION SYSTEM

This application is a continuation of Ser. No. 708,809, filed Mar. 6, 1985, now abandoned.

BRIEF SUMMARY OF THE INVENTION

The present invention teaches a new motorcycle drive wheel suspension system which allows the drive wheel to move in any direction within its plane of rotation. One embodiment does show a non-drive wheel application of the present invention.

The closest prior art known to the inventor is as follows: U.S. Pat. Nos. 4,408,674; 4,463,824; 4,114,918; 4,212,481. Of these patents, the closet to the present invention is U.S. Pat. No. 4,212,481 which shows a quadrilateral suspension system for a front wheel, not a drive wheel, in which the suspension limits the wheel to motion as though pivoted about an axis with relatively large range of vertical movement about the axis. FIG. 8 in that patent shows the range of motion permitted by that suspension to be in straight line. The other patents show a rear wheel drive suspension system in which the rear wheel is suspended from either one or two pairs of parallel swing arms which are fixed to the vehicle frame. In such suspensions, the range of motion of the drive wheel is limited to an arc formed by the swing arms.

The present invention teaches a drive wheel suspension system in which a single pivot axis is provided from the frame of the vehicle and a second axis of rotation is provided from the swing arm which is pivotally mounted on the frame. The present invention is shown in four embodiments.

DESCRIPTION OF THE INVENTION

Figure 1:
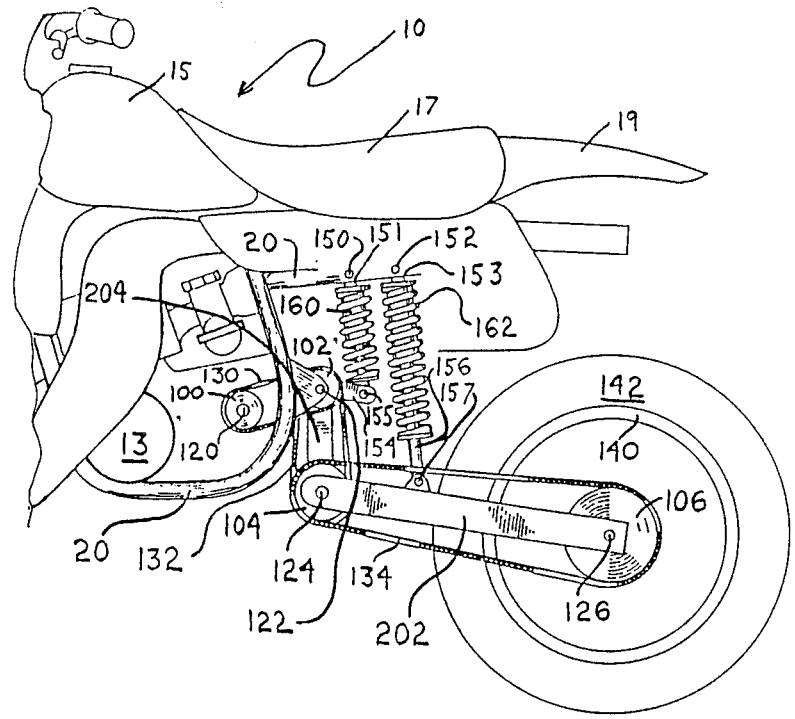
FIG. 1 is a side view of the rear portion of a motorcycle. It shows one embodiment including the rear wheel.
Figure 7:
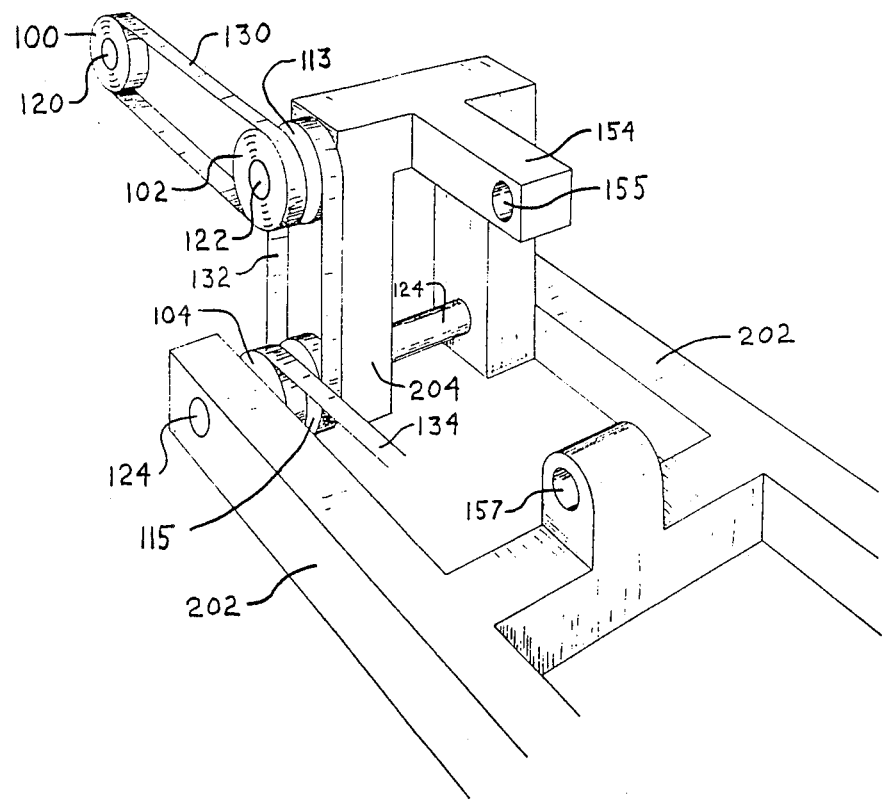
FIG. 7 is a rear perspective view of a portion of the embodiment in FIG. 1.
Figure 8:
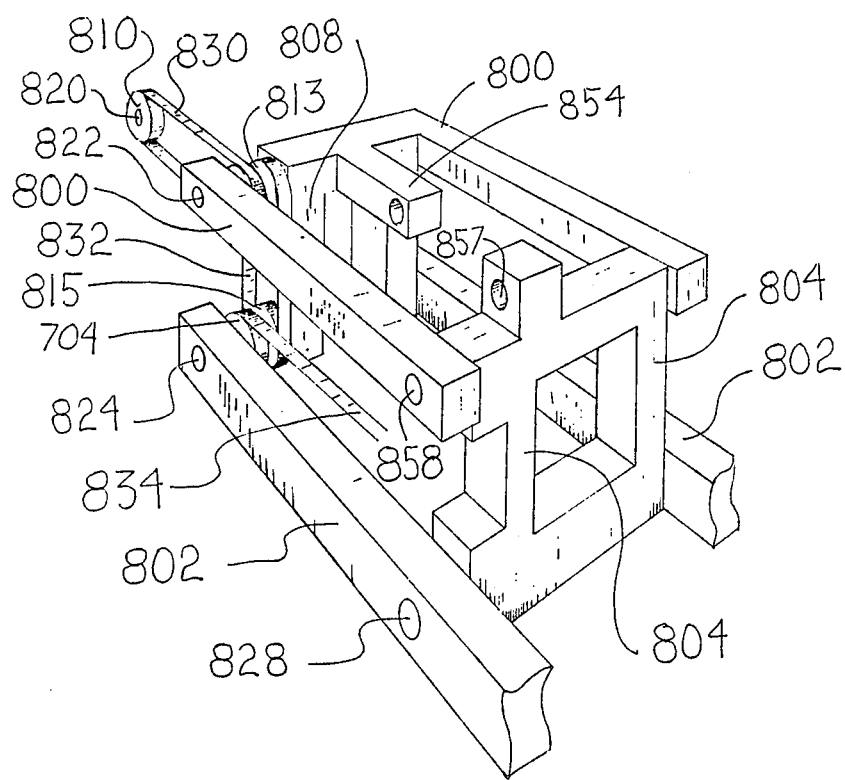
FIG. 8 is a rear perspective view of a portion of the embodiment in FIG. 3.

FIGS. 1 and 7 show side and front views of part of motorcycle generally shown by the numeral 10. The motorcycle has a gas tank 15, a seat 17, a rear fender 19 and a frame 20. Attached to the frame 20 is a motor 13 whose output is produced on gear 100 mounted on shaft 120. The power output is transmitted to gear 102 mounted on shaft 122 by chain 130. Gear 102 is mounted to frame 20.

A second gear 113 is connected to shaft 122 and drives chain 132 which is connected to a third gear 115 which is mounted on shaft 124. Shaft 124 also supports gear 104 for rotation which through chain 134 drives gear 106 to which is mounted wheel 140 and tire 142.

First and second swing arms 204 and 202 support wheel 140 on axle 126. A third arm 154 is mounted on swing arm 204. Arm 154 is attached to another portion of frame 20 through shaft 155 which is connected to a spring and shock absorber assembly 160 which is in turn connected directly to frame 20 by shaft 151 to mounting pin 150.

Swing arm 202 is connected by a similar structure to frame 20 through mounting pins 157 and 152 which are connected to shafts 153 and 156 respectively through spring and shock absorber assembly 162.

A careful inspection of the suspension structure shows that arm 154 is free to rotate relative to the frame 20 as is arm 204 which are both mounted to the shaft 122. At the same time swing arm 202 is free to rotate about shaft 124 which permits wheel 140 to move in any or all directions relative to frame 20 in the plane of rotation of the wheel 140.

Figure 2:
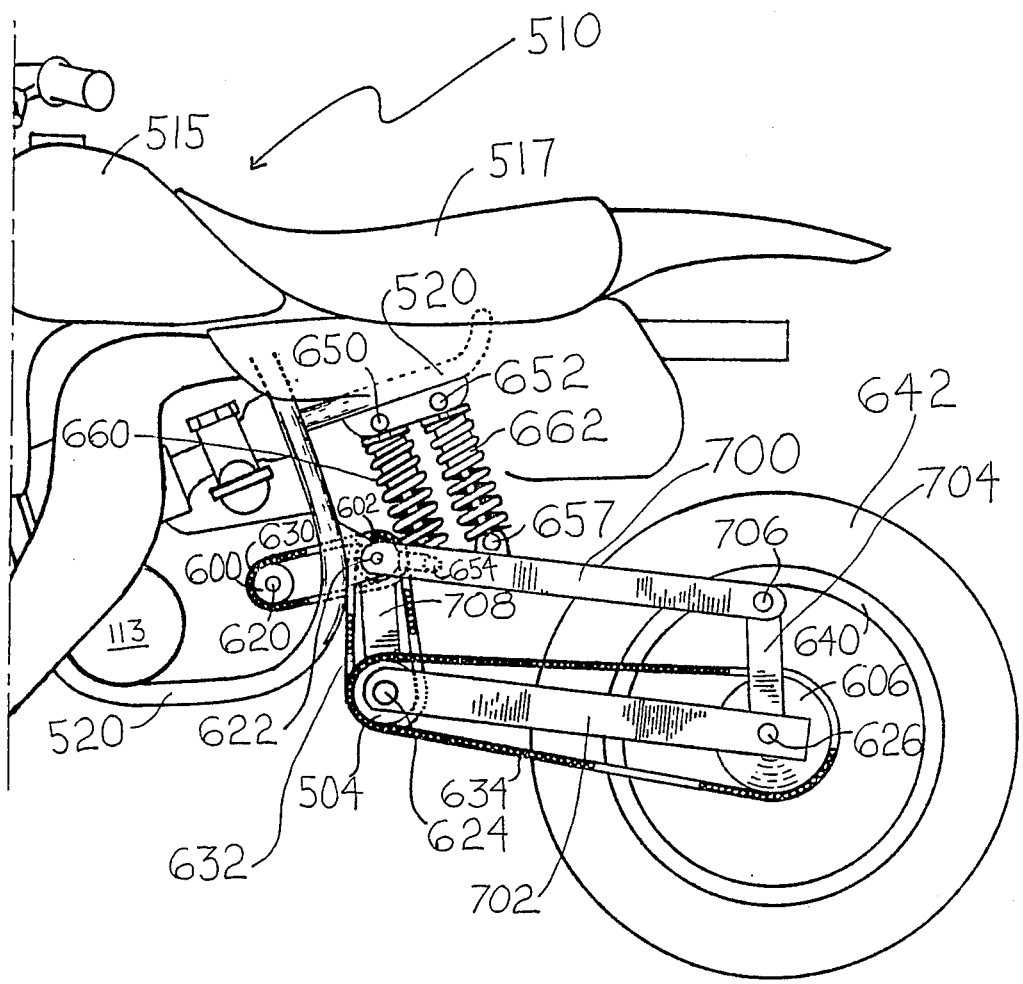
FIG. 2 is a side view of the rear portion of a motorcycle. It shows a second embodiment including the rear wheel.

FIG. 2 shows a side view of part of a motorcycle generally shown by the numeral 510. The motorcycle has a gas tank 515, a seat 517, and a frame 520. Attached to the frame 520 is a motor 13 whose output is produced on gear 600 mounted on shaft 620. The power output is transmitted to gear 602 mounted on shaft 622 by chain 630. Gear 602 is mounted to frame 520.

A second gear is connected to shaft 622 and drives chain 632 which is connected to a third gear which is mounted on shaft 624. This drive arrangement is essentially the same as that shown and described with reference to the first embodiment and therefore all the gears have not been shown in the figures for clarity. Shaft 624 also supports gear 504 for rotation which through chain 634 drives gear 606 to which is mounted wheel 640 and tire 642.

FIrst, second and third swing arms 700, 702 and 708 support wheel 640 on axle 622. Swing arm 700 is also mounted on shaft 622. Arm 654 is solidly attached to swing arm 708. Arm 654 connects swing arm 708 to frame 520 through spring and shock absorber assembly 660.

Swing arm 700 is connected by a similar structure to frame 520 through mounting pins 657 and 652 by spring and shock absorber assembly 662.

A careful inspection of the suspension structure shows that arm 700 is free to rotate relative to the frame 520 as is arm 708 which are both mounted to the shaft 622. At the same time swing arm 702 is free to rotate about shaft 624 which permits wheel 640 to move in any or all directions relative to frame 520 in the plane of rotation of the wheel 640. One difference between the structures shown in FIGS. 1 and 2, is that the FIG. 2 structure limits the rearward motion of wheel 640 to the distance allowed by the change in shape of the quadrilateral suspension formed of elements 700, 704, 702 and 708. The motorcycle generally shown by numeral 710 in FIG. 3 has a gas tank 715, a seat 717, a frame 720. Attached to the frame 720 is a motor 213 whose output is produced on gear 810 mounted on shaft 820. The power output is transmitted to a frame mounted gear (not labelled) rotatably mounted on shaft 822 by chain 830.

A second gear 813 is connected to shaft 822 and drives chain 832 which is connected to a third gear 815 which is mounted on shaft 824. Shaft 824 also supports gear 704 for rotation which through chain 834 drives gear 806 to which is mounted wheel 840 and tire 842.

Arms 800,802,804 and 808 support wheel 840 on axle 826. Arm 800 is pivotally mounted on shaft 822. Arm 854 is solidly attached to arm 808. Arm 854 connects swing arm 808 to frame 720 through spring and shock absorber assembly 855.

Arm 804 is pivotally connected to arm 802 at 828 and to arm 800 at 858. Arm 804 is also interconnected to frame 720 through shafts 852 and 857 by spring and shock absorber assembly 662.

Figure 3:
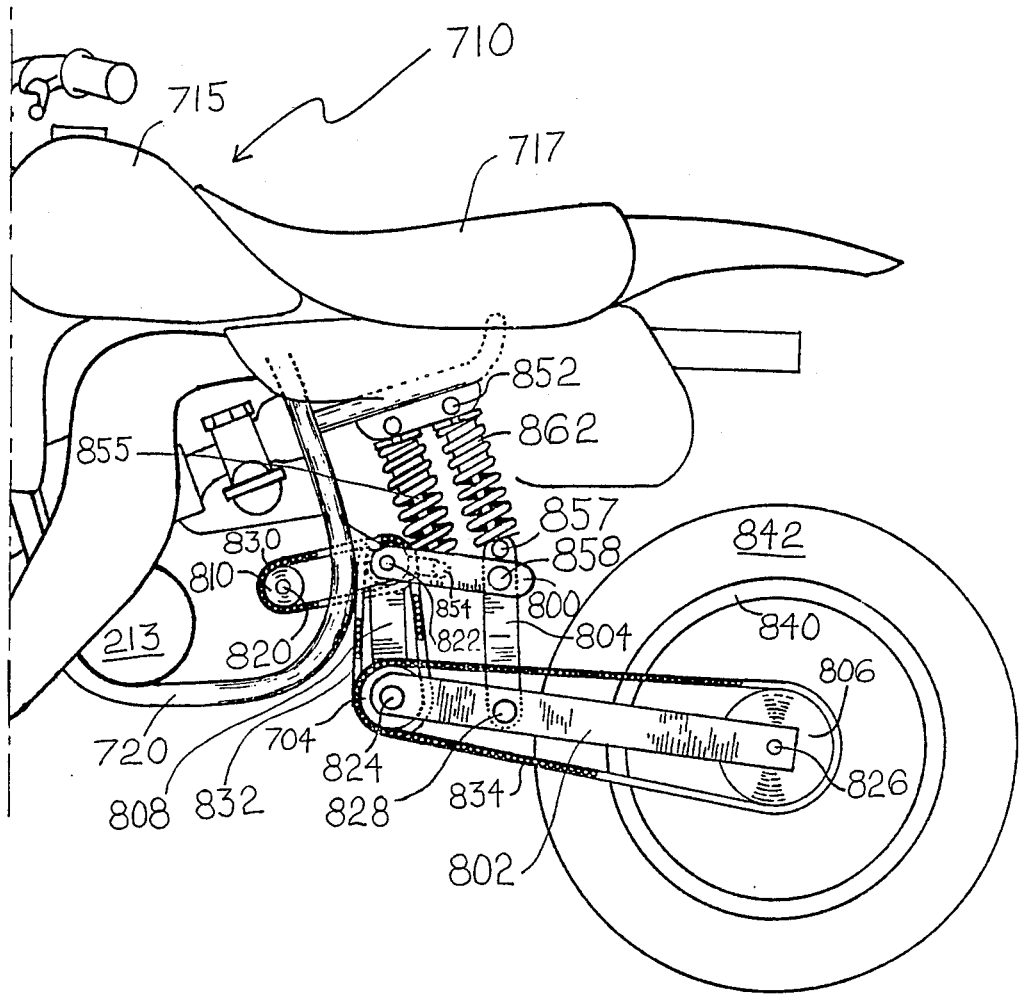
FIG. 3 is a side view of the rear portion of a motorcycle. It shows a third embodiment including the rear wheel.

A careful inspection of the suspension structure shows that arm 800 is free to rotate relative to the frame 720 as is arm 808 which are both mounted to the shaft 822. At the same time swing arm 802 is free to rotate about shaft 824 which permits wheel 840 to move in any or all directions relative to frame 720 in the plane of rotation of the wheel 840. One difference between the structures shown in FIGS. 1 and 3, is that the FIG. 3 structure limits the rearward motion of wheel 840 to the distance allowed by the change in shape of the quadrilateral suspension formed of elements 800, 804, 802 and 808.

Figure 4:
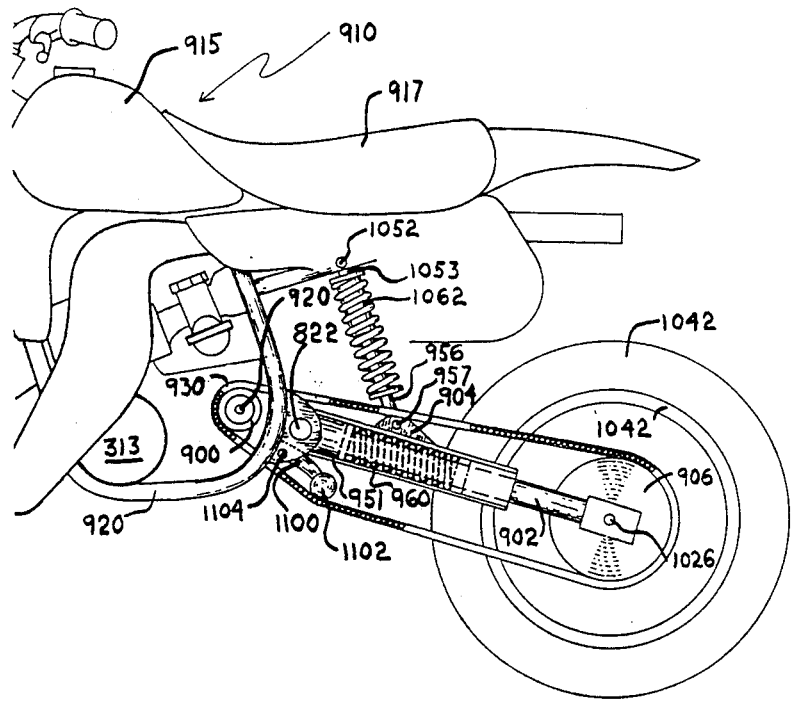
FIG. 4 is a side view of the rear portion of a motorcycle. It shows a fourth embodiment including the rear wheel.

FIG. 4 shows a side view of a part of motorcycle generally shown by the numeral 910. The motorcycle has a gas tank 915, a seat 917, a frame 920. Attached to the frame 920 is a motor 313 whose output is produced on gear 900. The power output is transmitted to gear 906 mounted on shaft 1026 by chain 930.

A swing arm 902 and spring-shock absorber assembly 960 interconnect axle 1026 and frame 920 through shaft 822. The shock absorber-spring assembly has an outer cover 951. Attached to the outer cover 951 is a connecting tab 904 for holding pin 957 which is attached to shaft 956. Shaft 956 is attached to spring and shock absorber assembly 1062 which are attached to shaft 1053 which is in turn connected to the frame 920 through pin 1052.

The operation of the embodiment shown in FIG. 4 is able to be understood upon inspection. Rear wheel 1042 can pivot about shaft 822 and move in the direction of shaft 902 because of the telescoping spring-shock absorber connection to the frme 920.

An idler arm 1100 is mounted on shaft 1104 and has idler roller 1102 fixed thereon for controlling the tension in the chain 930.

Figure 5:
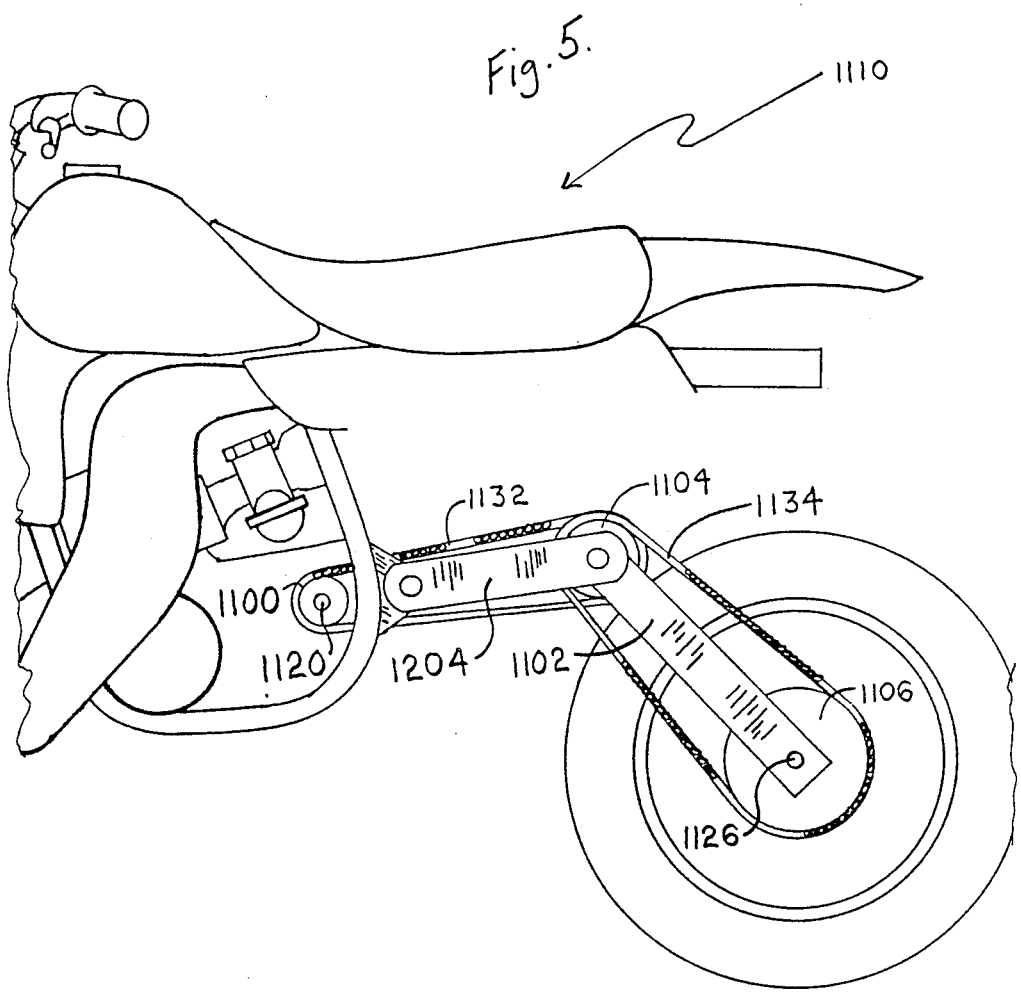
FIG. 5 is a side view of the rear portion of a motorcycle. It shows an embodiment similar to FIG. 1. It also has the rear wheel included.

FIG. 5 shows an another embodiment of the present inventions which is basically the same structure as shown in FIG. 1 except rotated 180 degrees. This embodiment is shown without the springs and shock absorbers. In this embodiment parts which are similar in function to those in FIG. 1 have like numbers except that they are preceded by a numberal "1". That is part 100 and part 1100 perform the same function.

Figure 6:
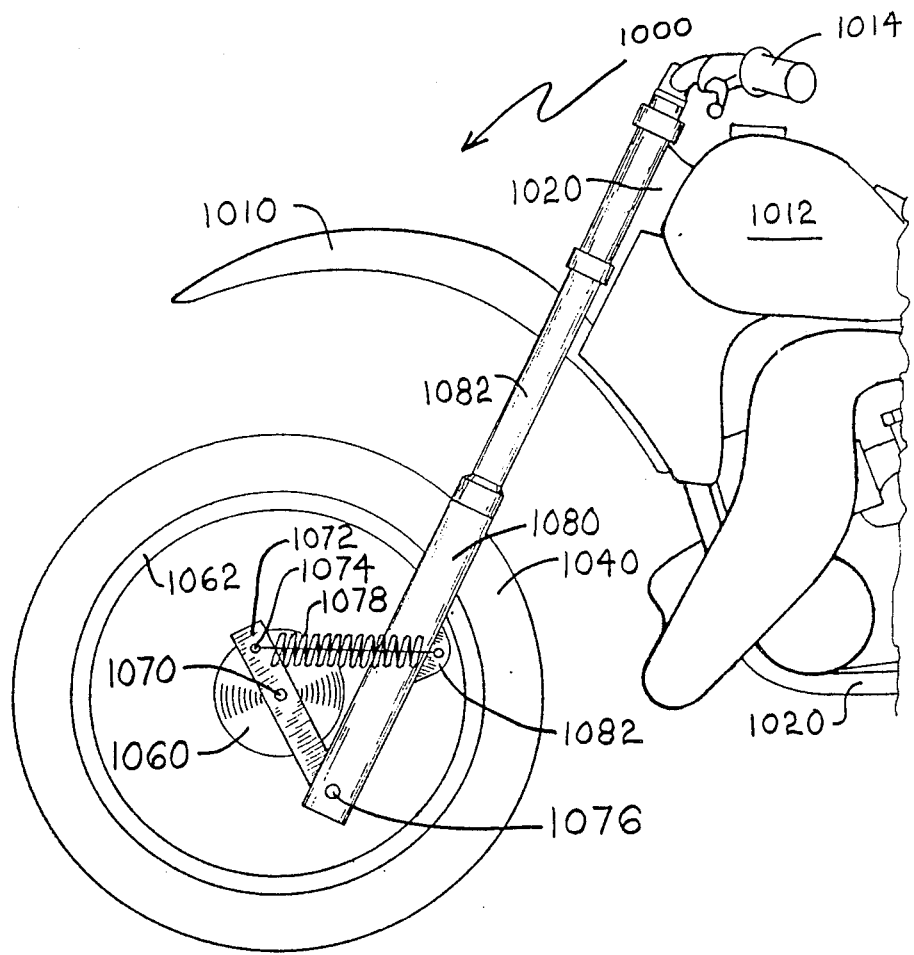
FIG. 6 is a side view of the front portion of a motorcycle. It shows a front wheel embodiment.

FIG. 6 shows a further embodiment of the present invention in a side view. A front portion of a motocycle shown by the number 1000 has a front fender 1010, a frame 1020 and handlebars 1014. The upper part of the frame 1020 is attached to two sections which can telescope with respect to each other 1080 and 1082. A tab 1081 is attached to lower telescoping arm 1080 for connection to one end of swing arm 1072. A spring 1078 which can have a shock absorber associated therewith interconnects swing arm 1072 and lower arm 1080. Swing arm 1072 is attached to the lower end of arm 1080 by a shaft 1076.

A wheel 1060 and rim 1062 having a tire 1040 are mounted on shaft 1070 for rotation. Shaft 1070 is mounted for rotation in swing arm 1072.

It can be easily seem that this FIG. 6 embodiment of the present invention allows the front wheel and axle of the motorcycle a wide range of controlled positions within the plane defined by the wheel rotation.

What is claimed is:

1. In a motorcycle having an engine and power transfer assembly, a rear wheel, a front wheel, a frame system, and means for connecting the engine and power transfer assembly with the rear wheel, a means for suspending the rear wheel from the frame system comprising:

a first swing arm means having first and second ends;
means pivotally mounting the first end of said first swing arm means to said frame system;
a first resilient shock absorber assembly operatively connecting said first swing arm means to said frame system;
a second swing arm means having first and second ends;
means pivotally mounting the first end of said second swing arm means to the second end of said first swing arm means such that said first and second swing arm means are in a non-linear relationship;
a second resilient shock absorber assembly operatively connecting said second swing arm means to said frame system;
and means rotatably mounting the rear wheel to the second end of said second swing arm means, wherein said means for suspending the rear wheel permits the distance between the rear wheel and the point at which the first end of said first swing arm means is mounted to said frame system to vary such that said rear wheel may move in a plurality of paths relative to the frame system and have freedom of movement in any direction relative to the frame system, within a plane defined by the rotation of the rear wheel.

2. A motorcycle as recited in claim 1 wherein said first swing arm means extends downwardly from said frame system and has a rearwardly extending member solidly secured thereto, said first resilient shock absorber being pivotally mounted at one end to said member and at the other end to said frame system.

3. A motorcycle as recited in claim 1 wherein said means for suspending the rear wheel includes third and fourth swing arm means, means pivotally connecting said third and fourth swing arm means together at one end, means pivotally connecting the other end of said third swing arm means to said frame system at the point at which said first swing arm means is connected to said frame system, means pivotally connecting the other end of said fourth swing arm means to the point at which the rear wheel is rotatably mounted, said swing arms being arranged in a quadrilateral configuration with said first and second swing arm means being located opposite said fourth and third swing arm means respectively, and wherein said second resilient shock abosorber assembly is directly pivoted between said third swing arm means and said frame system.

4. A motorcycle as recited in claim 3 wherein said first swing arm means extends downwardly from said frame system and has a rearwardly extending member solidly secured thereto, said first resilient shock absorber being pivotally mounted at one end to said member and at the other end to said frame system.

5. A motorcycle as recited in claim 1 wherein said means for suspending the rear wheel includes third and fourth swing arm means, one end of said third swing arm means being pivotally connected to said second swing arm means at an intermediate portion thereof, one end of said fourth swing arm means being pivotally connected to said frame system at the point at which said first swing arm means is connected to said frame system, the other end of said fourth swing arm means being pivotally secured to an upper portion of said third swing arm means, said swing arms being arranged in a quadrilateral configuration with said first and third swing arm means being located opposite each other, and wherein said second resilient shock absorber assembly is pivotally mounted at one end to said frame system and at the other end to said third swing arm means at the end opposite the connection to said second swing arm means.

6. A motorcycle as recited in claim 5 wherein said first swing arm means extends downwardly from said frame system and has a rearwardly extending member solidly secured thereto, said first resilient shock absorber being pivotally mounted at one end to said member and at the other end to said frame system.

* * * * *